United States Patent
Song

(10) Patent No.: US 8,583,117 B2
(45) Date of Patent: Nov. 12, 2013

(54) WIRELESS COMMUNICATION DEVICE THAT PRIORITIZES ACCESS PROBE HANDLING USING A PREDETERMINED TRANSMISSION DELAY

(75) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1307 days.

(21) Appl. No.: 12/177,546

(22) Filed: Jul. 22, 2008

(65) Prior Publication Data

US 2010/0022249 A1    Jan. 28, 2010

(51) Int. Cl.
*H04W 4/00* (2009.01)
*H04W 60/00* (2009.01)

(52) U.S. Cl.
USPC ......... 455/435.3; 455/525; 455/561; 370/328

(58) Field of Classification Search
None
See application file for complete search history.

(56) References Cited

U.S. PATENT DOCUMENTS

| | | |
|---|---|---|
| 5,729,542 A | 3/1998 | Dupont |
| 2003/0199252 A1 | 10/2003 | Tiedemann et al. |
| 2004/0032877 A1 | 2/2004 | Chuah et al. |
| 2007/0002789 A1 | 1/2007 | Zhang |
| 2007/0076682 A1 | 4/2007 | Kim et al. |
| 2007/0274267 A1 | 11/2007 | Tiedemann et al. |

FOREIGN PATENT DOCUMENTS

| | | |
|---|---|---|
| EP | 0994634 | 4/2000 |
| JP | 2000201383 A | 7/2000 |
| JP | 2006093913 A | 4/2006 |
| WO | 2007035058 A2 | 3/2007 |

OTHER PUBLICATIONS

International Search Report, PCT/US2008/084706, International Searching Authority, European Patent Office, May 4, 2009.
Written Opinion, PCT/US2008/084706, International Searching Authority, European Patent Office, May 4, 2009.

*Primary Examiner* — Philip Sobutka
(74) *Attorney, Agent, or Firm* — Raphael Freiwirth

(57) ABSTRACT

A wireless communication device that prioritizes the receipt of access probes within the slots of a base station having a slotted access protocol for incoming communications from wireless communication devices, where the slotted access protocol includes a plurality of discrete slots in which communication packets from wireless communication devices are received and communication packets arriving earlier in a slot are handled first by the base station. The wireless communication device can statically or dynamically change a predetermined delay in sending the access probe to insure it arrives earlier or later in a slot so as to cause a priority of handling by the base station.

26 Claims, 4 Drawing Sheets

WIRELESS COMMUNICATION DEVICE THAT PRIORITIZES ACCESS PROBE HANDLING USING A PREDETERMINED TRANSMISSION DELAY

BACKGROUND OF THE INVENTION

1. Field of the Invention

The present invention relates to mobile communications. More specifically, the present invention relates a wireless communication device that prioritizes the handling of access probes from wireless communication devices sent to a base station, preferably in a Code Division Multiple Access (CDMA) wireless communication network.

2. Description of the Related Art

In computer networks, both wired and wireless, a problem arises in "contention management," which is when data collisions occur in a shared medium for transmission when two client machines both attempt to send data at the same time. Networking protocols include mechanisms to detect and correct for the data collisions created, such as "Carrier Sense Multiple Access With Collision Detection" (CSMA/CD), used by Ethernet, and the "Aloha" protocol for wireless networks. Aloha is an OSI layer 2 protocol for networks with broadcast topology. One major difference between Aloha and Ethernet protocols on a shared transmission medium is that Ethernet protocol uses CSMA/CD, which broadcasts a jamming signal to notify all computers connected to the channel that a collision occurred, forcing computers on the network to reject their current packet or frame. The basic Aloha protocol simply notifies the computers of the collision and requests that they send their data again later, with no specific generally accepted methodology to determine the delay.

An improvement to the original Aloha protocol was "Slotted Aloha," which introduced discrete timeslots in which a data could be received. To implement the protocol, a centralized "clock" sends out data to the outlying clients to inform of the timing for the slots, and the clients are only allowed to send their packets immediately after receiving slot time data. A client can send only at the beginning of a timeslot, and thus collisions are reduced because the windows for a collision are greatly reduced.

Most CDMA wide-area access networks use a variant of the Slotted-Aloha protocol as an Access Channel (AC) multiple access protocol. An "access channel" is typically a mobile device-to-base station communications channel used primarily for control and sending short messages, such as call origination, page response, and registration. Individual access messages are contained in short "bursts" of data called "probes," and the probes are handled based upon when they are received in the timing slots at the base station.

Thus, the access probes from the wireless communication device can collide within the timing slots at the base station, and the data first received in the slot will be handled to the detriment of the other devices sending colliding data. It is thus to the provision of a wireless communication device and method that prioritizes the handling of received access probes that the present invention is primarily directed.

SUMMARY OF THE INVENTION

Briefly described, the present invention includes a system, method, and wireless communication device that prioritize the receipt of access probes within the slots of a base station having a slotted access protocol for incoming communications from wireless communication devices, where the slotted access protocol includes a plurality of discrete slots in which communication packets from wireless communication devices are received and communication packets arriving earlier in a slot are handled first by the base station. The wireless communication device can statically or dynamically change a predetermined delay in sending the access probe to insure it arrives earlier or later in a slot so as to cause a priority of handling by the base station for any collision that might occur from the sent probe. There may be additional delays in use by the wireless communication device in sending access probes, such as PN randomization, to avoid data collision and temporal advantages in proximity to the base station.

In one embodiment, the wireless communication device selectively communicates with a base station that includes a slotted access protocol for incoming communications from wireless communication devices, the slotted access protocol including a plurality of discrete slots in which communication packets from wireless communication devices are received and communication packets arriving earlier in a slot being handled first by the base station, the wireless communication device including a computer platform configured to substantially synchronize communications from the wireless communication device with the slotted access protocol of the base station. A first communication device is on or accessible to the computer platform and is configured to request resources from the base station by sending an access probe thereto, typically on an access channel. A second communication device is also on the computer platform and is configured to send any access probe to the base station, and the second communication device is configured to prioritize the receipt of access probes within the slots at the base station through including a predetermined delay in the transmission of the access probe from the wireless communication device to the base station thereby causing higher priority access probes to be received earlier in a slot at the base station.

In one embodiment, the method for prioritizing access probes from a wireless communication device that selectively communicates with a base station having a slotted access protocol for incoming communications from wireless communication devices, with the slotted access protocol include a plurality of discrete slots in which communication packets from wireless communication devices are received and communication packets arriving earlier in a slot being handled first by the base station, the method includes the steps of synchronizing communications from the wireless communication device with the slotted access protocol of a base station, then prioritizing the receipt of access probes within the slots at the base station through including a predetermined delay in the transmission of the access probe to the base station thereby causing higher priority access probes to received earlier in a slot at the base station, and sending the access probe to the base station to send data and/or request resources therefrom.

The present system and method are therefore advantageous in that they provide a mechanism that can penalize a low priority access probe only when it otherwise competes with a higher priority probe in the same access channel slot at the base station. A more aggressive access parameter can easily be applied to higher priority access probes than to lower priority access probes even if other collision avoidance mechanisms are in use. The prioritization of access probe receipt is particularly advantageous in timing-critical communications such as PTT group communication setup and transmission.

Other objects, features, and advantages of the present invention will become apparent after review of the Brief Description of the Drawings, Detailed Description of the Invention, and the Claims.

DETAILED DESCRIPTION OF THE INVENTION

Figure 1:
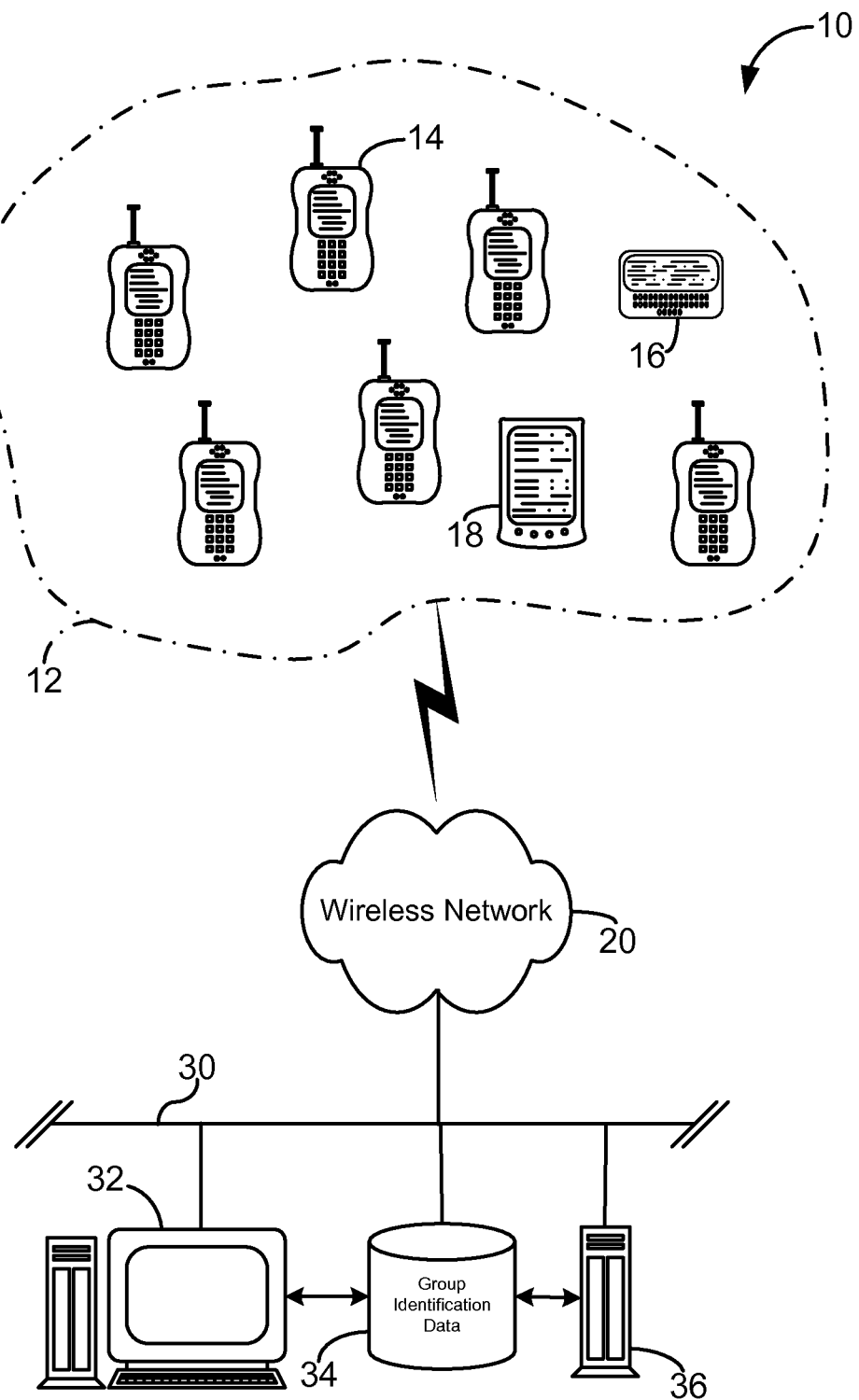
FIG. 1 is a representative diagram of a wireless network with a designated PTT group of wireless telecommunication devices communicating with a group communication server and other computer devices across the wireless network.

In this description, the terms "communication device," "wireless device," "wireless communications device," "PTT communication device," "handheld device," "mobile device," and "handset" are used interchangeably. The terms "call" and "communication" are also used interchangeably. The term "application" as used herein is intended to encompass executable and non-executable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

The present system and method allows all wireless communication devices to have the same persistence probability, yet still implement different priority levels of different access probes by leveraging a property of the CDMA standard. In CDMA systems, an access probe can be successfully decoded by the base station even when it collides with one or more other access probes of similar received power level if the access probe arrives at the base station earlier than any other access probes by a certain number of "chips." Typically, the duration of a chip in CDMA systems is sufficiently smaller than the duration of an information bit. This implies that the base station can successfully decode an access probe even when it collides with another access probe which is separated in time by a very short period. In order to make higher priority access probes arrive at the base station earlier, the wireless communication device can delay the transmission of its access probe by a specified number of chips, according to the priority level of the access probe. No chip-level delay is applied to the highest priority access probes ($d1=0$), $d2$ chip-delay is applied to the next highest priority level access probes, and so forth. In general, N priority levels can be defined by using $d1, d2, \ldots, dN$ ($d1<d2<\ldots<dN$) where $dN$ denotes the chip-delay applied to the access probes in the $n^{th}$ priority level. Furthermore, the predetermined delay can be combined with the traditional prioritization mechanism that uses different persistence probabilities. That is, the chip delays can be used to further prioritize the access probes that otherwise share a common persistence probability.

In a 1x EV-DO network, different persistence probabilities (A Persistence) are defined for different access terminal classes. A standard practice for assigning different priorities to different wireless communication devices 14,16,18 is to define multiple classes of devices and apply different access parameters according to the class. For example, devices belong to a high priority class, such as emergency personnel, can transmit an access probe quickly since they have a favorable persistence probability. Devices in a low priority class experience longer access channel transmission delays since they need to go through a longer persistence test. A less favorable persistence probability is preferably applied to them irrespective of the access channel traffic load. In an alternate embodiment, if prioritization is needed per access probe basis rather than per wireless communication device basis, different persistence priorities can be applied to different access probes from the same wireless communication device 14,16,18.

FIG. 1 illustrates one embodiment of a typical system 10 for sharing group communications among one or more wireless telecommunication devices in a PTT group 12, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set of one or more other wireless telecommunication devices of the plurality. For example, the target set for mobile telephone 14 can be all devices in the communication group 12 or a subset thereof, such as pager 16 and PDA 18.

In this embodiment, the wireless telecommunication device (such as mobile telephone 14) sends a flag to at least the group communication computer device, shown here as server 32, which is present on a server-side LAN 30 across the wireless network 20, to indicate that the wireless device is present, i.e. accessible, on the wireless network 20. The group communication computer device 32 can share this information with the set of target wireless telecommunication devices designated by the first wireless telecommunication device, or can also share is with other computer devices resident on the server-side LAN 30 or accessible across the wireless network 20. The group communication computer device 32 can have an attached or accessible database 34 to store the group identification data for the wireless devices. A data store 36 can also present on the server-side LAN 30 for selectively storing any data regarding the group communications. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14,16,18 and the one or more other wireless telecommunication devices of the target set. Also, the group communication computer device 32 can attempt to bridge the requested direct communication with the target set if at least one of the wireless telecommunication devices of the target set have informed the group communication computer device 32 of their presence on the wireless network 20.

The group communication computer device 32 can also inform the wireless telecommunication device 14,16,18 of the inability to bridge a direct communication to the target set 12 upon none of the wireless telecommunication devices (or at least one) of the target set not having informed the group communication computer device 32 of their presence on the wireless network 20. Further, while the group communication computer device 32 is shown here as having the attached database 34 of group identification data, the group communication computer device 32 can have group identity data resident thereupon, and perform all storage functions described herein.

In additional to half-duplex voice communications, there can be group-directed media, such as pictures in JPEG, TIF, and the like, audio files such as MP3, MP4, WAV, and the like. The media can also be streaming media, such as a multimedia application (Powerpoint, MOV file, and the like). The group-directed media can also be streaming media, or an interactive session on another computer device on the wireless communication network 20, such as a game hosted on data store 36 or private bulletin board. Also, the group-directed media could be half-duplex video conferencing among members of the communication group wherein the picture of the speaker is broadcast to the other group members in substantial real-time, or in delay.

The wireless communication device 14,16,18 can send communication group identification data to the group communication computer device 32 at the time of requesting the group-directed communication to be sent, e.g. send a target list. Alternately, prior to the wireless communication device sending group-directed communications, the wireless communication device 14,16,18 can request member data for a communication group 12 from the group communication computer device 32, and the group communication computer device 32 can send one or more addresses or communication group addresses to the wireless communication device 14,16,18.

Figure 2:
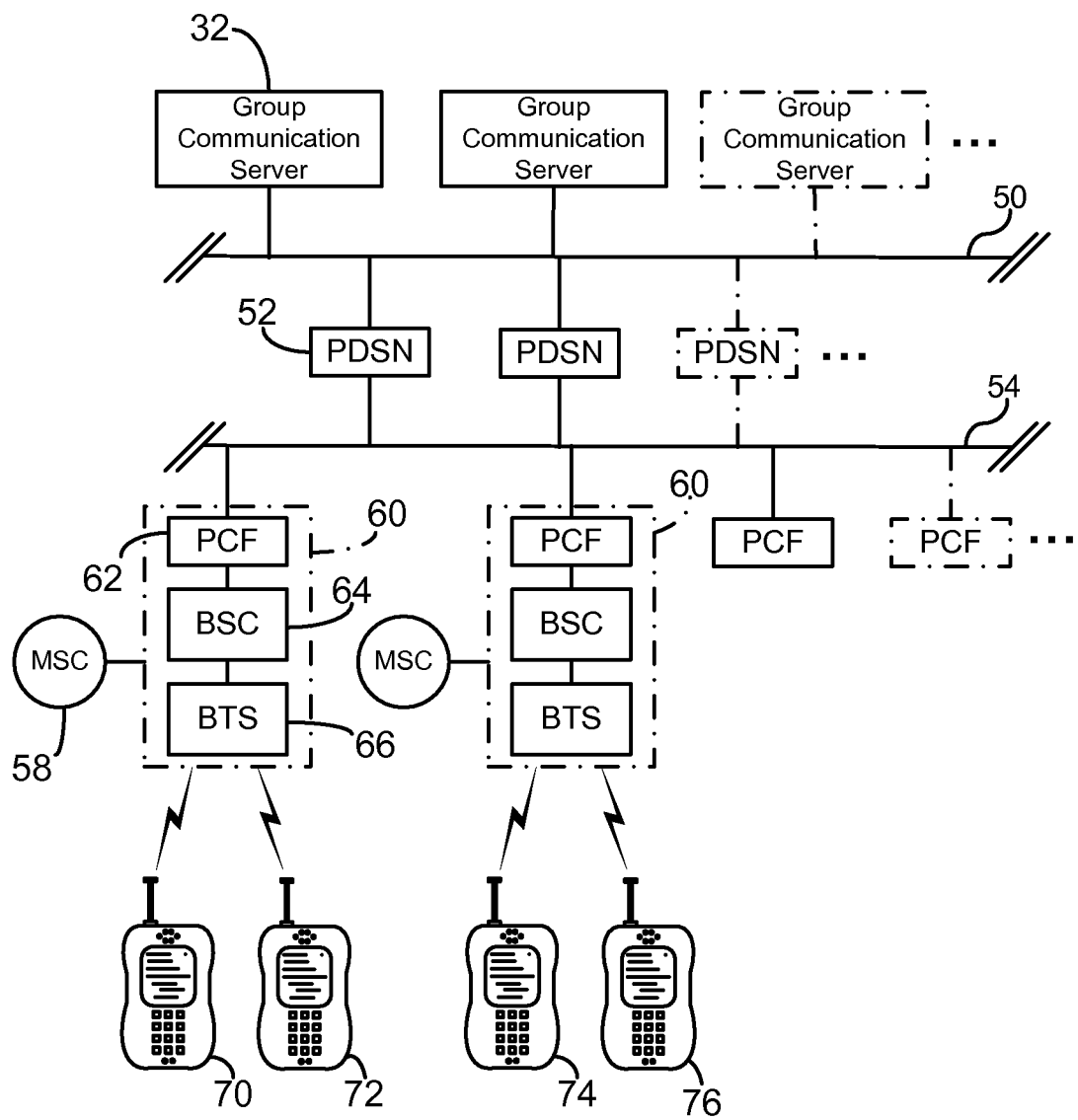
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a series of group communication computer devices (group communication servers) 32 that control communications between the wireless communication devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service provider's packet data service node (PDSN) such as PSDN 52, shown here resident on a carrier network 54. Each PSDN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 54 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art. It should also be noted that carrier boundaries and/or PTT operator network boundaries do not inhibit or prohibit the sharing of data as described herein.

Cellular telephones and mobile telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and data. In wireless devices that have designated a communication group 12 (FIG. 1), the wireless communication device can directly connect with the other member of the set and engage in voice and data communication. However, all such direct communications will occur through, or at the control of, the group communication computer device 32. All data packets of the devices do not necessarily have to travel through the group communication computer device 32 itself, but the group communication computer device 32 must be able to ultimately control the communication because it will typically be the only server-side 30 component that is aware of and/or can retrieve the identity of the members of the communication group, or direct the identity of the members of the communication group 12 to another computer device.

Figure 3:
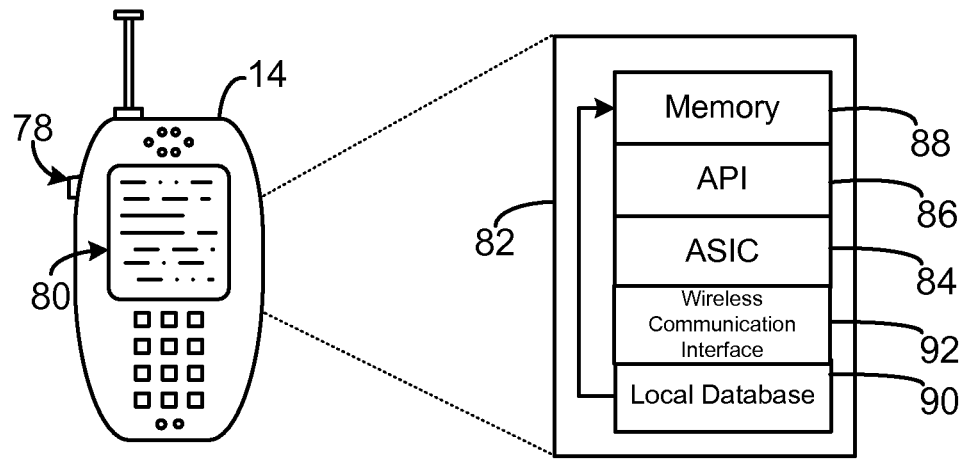
FIG. 3 is a block diagram illustrating the computer platform of the wireless telecommunication device with PTT capability.

FIG. 3 is a block diagram illustrating one embodiment of the wireless telecommunication device being a mobile telephone 14 with a PTT button 78 that opens the direct communication to a target set of devices, i.e. other members of the communication group 12. The wireless device 14 is also shown as having a graphics display 80 to the user of the wireless device 14. The wireless device 14 includes a computer platform 82 that can handle voice and data packets, and receive and execute software applications transmitted across the wireless network 20 to include the group-directed media. The computer platform 82 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by QUALCOMM® for wireless device platforms.

As shown here, the wireless device can be a mobile telephone 14, with a graphics display 80, but can also be any wireless device with a computer platform 82 as known in the art, such as a personal digital assistant (PDA), a pager with a graphics display 80, or even a separate computer platform 82 that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The graphics display 80 can present not only information about the ongoing group call, but also the information on the group-directed media, to include a file preview as is more fully described herein.

In this embodiment of the wireless device, the computer platform 82 also includes a direct communication interface 92 that can open the direct communication channel from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
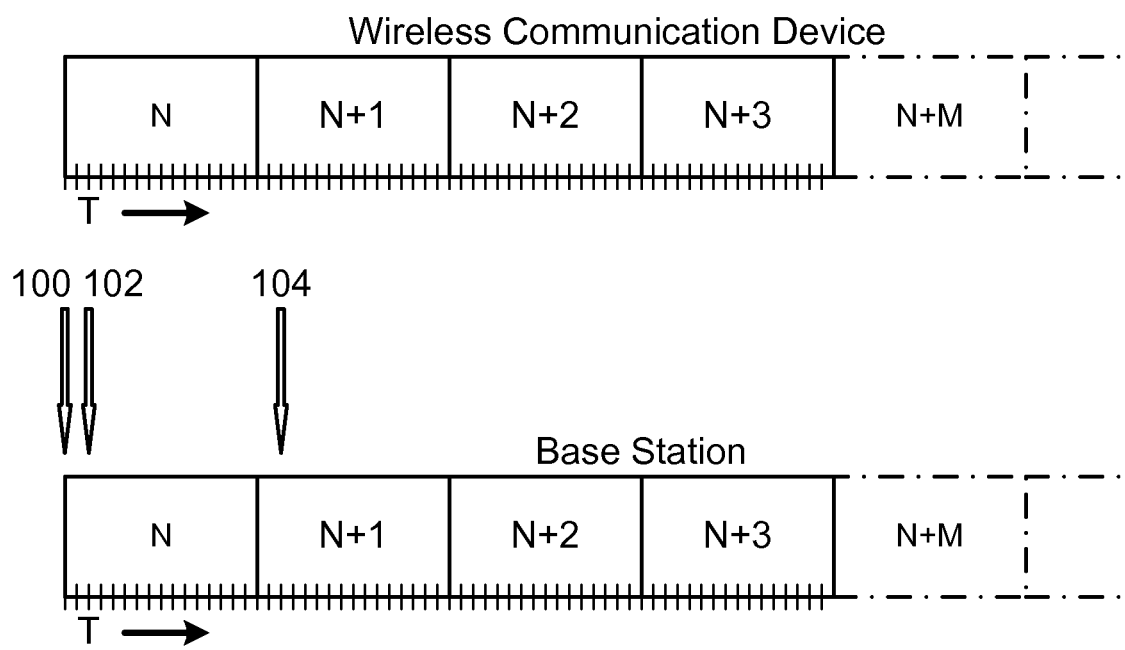
FIG. 4 is a representative diagram of the communication slots of the base station aligned with one of the wireless communication devices, with access probes being received at the base station from the wireless communication device and other devices.

FIG. 4 is a representative diagram of the communication slots of the base station aligned with one of the wireless communication devices. Each slot duration spans many chip durations. Access probes are received at the base station from the wireless communication device 14,16,18 and other devices. Access probes 100,102,104 are received within a given slot at the base station. The access probes can be used to either send data or request resources from the system. As used herein and in the Claims, the term "send data or request resources" is intended to encompass either function individually or both combined. Access probe 100 will be handled in slot N since it was received earlier than access probe 102 by a few chips. Access probe 102 will not be seen by the base station unless the base station has a capability to handle multiple access probes in a slot. If access probe 102 is not handled by the base station in slot N, the associated communication device will retransmit the access probe later. Access probe 104 will be handled in slot N+1 as it was received in that slot. The present system accordingly can set a delay in a low priority probe such that it will arrive later in a given slot, such as similar to probe 102. The predetermined chip delay can cause, in one embodiment, access probes related to PTT communications to always arrive first in a slot, such as access probe 100.

It should be noted that a low priority access probe is likely to be lost since it arrives at the base station 60 later than the higher priority access probe. If the base station 60 is capable of decoding two or more simultaneous access probes which are separated by a certain number of chips, both access probes can be successfully decoded in the sequence received.

Figure 5:
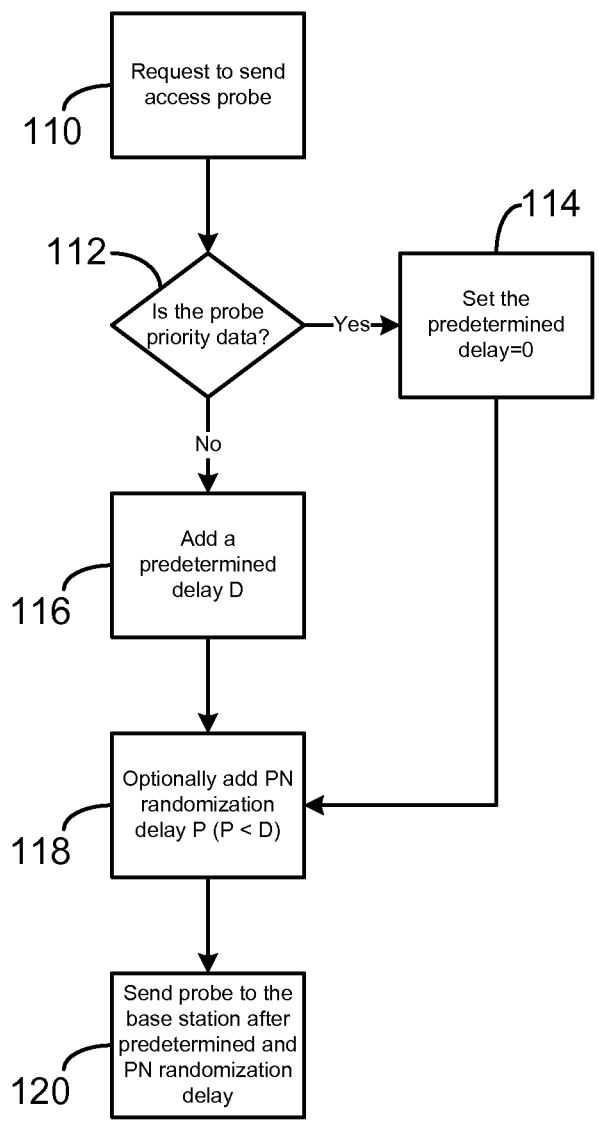
FIG. 5 is a flowchart of the process for prioritizing access probes being sent to the base station such that high priority access probes are likely to be received first in a given slot and given priority in the event of a collision.

FIG. 5 is a flowchart of one embodiment the process for prioritizing access probes being sent to the base station 60 such that high priority access probes are likely to be received first in a given slot and given priority in the event of a collision, as shown in FIG. 4. A request to send an access probe is received at the computer platform of the wireless communication device 14,16,18, as shown at strep 110. A determination is then made as to whether the access probe contains priority data, as shown at decision 112, and if the access probe does contain priority data, then the predetermined chip delay is set to 0. Otherwise, if the probe does not have priority at decision 112, then a predetermined delay D is added, as shown at step 116. Optionally, an additional PN randomization delay, which is often used in CDMA systems, can be applied in order to randomize the reception time of probes within the same priority level as shown at step 118, where preferably randomization delay P is utilized such that (P<D). The probe is then sent to the base station 60 after elapse of the predetermined delay and PN randomization delay, as shown at step 120. The idea can be generalized to more than two priority levels in a straightforward manner. This same methodology can be applied with a wide variety of parameters, such as a default delay, a reverse assumption of priority, and other variants as would be obvious to one of skill in the art.

It can be seen that system 10 provides an inventive method for prioritizing access probes from a wireless communication device 14,16,18 that selectively communicates with a base station 60 having a slotted access protocol for incoming communications from wireless communication devices (as shown in FIG. 4), with the slotted access protocol include a plurality of discrete slots in which communication packets from wireless communication devices 14,16,18 are received and communication packets arriving earlier in a slot being handled first by the base station 60, including the steps of synchronizing communications from the wireless communication device 14,16,18 with the slotted access protocol of a base station 60, prioritizing the receipt of access probes within the slots at the base station 60 through including a predetermined delay in the transmission of the access probe to the base station 60 thereby causing higher priority access probes to received earlier in a slot at the base station 60, and sending the access probe to the base station 60 to send data and/or request resources therefrom.

In one embodiment, the computer platform 82 can include a clock cycle wherein each cycle is shorter in duration than the duration of a slot of the base station 60, and including a predetermined delay in the transmission of the access probe to the base station 60 including a predetermined number of clock cycles (chip delay, etc.). The base station 60 can further selectively ignore the priority in which the access probe is received in a slot. Further, the wireless communication device 14,16,18 can selectively change the predetermined delay based upon predetermined criteria, such as the wireless communication device 14,16,18, or the type of access probe being sent. One or more additional predetermined delays to an access probe can be implemented by the wireless communication device 14,16 18. Furthermore, sending the access probe to the base station 60 to request resources therefrom can be requesting a traffic channel, or any other resource as would be known to one of skill in the art.

In view of the methods being executable on a mobile device and other computer platforms, the method can accordingly be performed by a program resident in a computer readable medium, where the program directs the mobile device or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the invention has been particularly shown and described with reference to a preferred embodiment thereof, it will be understood by those skilled in the art that various changes in form and detail may be made without departing from the scope of the present invention as set forth in the following claims. Furthermore, although elements of the invention may be described or claimed in the singular, the plural is contemplated unless limitation to the singular is explicitly stated.

What is claimed is:

1. A wireless communication device that selectively communicates with a base station wherein the base station includes a slotted access protocol for incoming communications from wireless communication devices, the slotted access protocol including a plurality of discrete slots in which communication packets from wireless communication devices arrive and communication packets arriving earlier in a slot are handled first by the base station, the wireless communication device comprising:
   a computer platform configured to substantially synchronize communications from the wireless communication device with the slotted access protocol of the base station;
   a first communication device configured to send data to or request resources from the base station by sending a first access probe to the base station; and
   a second communication device configured to send a second access probe to the base station, determine whether the second access probe contains priority data, and prioritize when the second access probe will arrive within the slots at the base station through setting a predetermined delay in a transmission of the second access probe from the wireless communication device to the base station based on the determination, thereby causing higher priority access probes to arrive earlier in a slot at the base station.

2. The wireless communication device of claim 1, wherein the computer platform includes a clock cycle wherein each cycle has a shorter duration than the slot at the base station, and wherein the predetermined delay in the transmission of the second access probe is a predetermined integer number of clock cycles of the computer platform.

3. The wireless communication device of claim 1, wherein the first communication device and the second communication device are discrete devices accessible to the computer platform of the wireless communication device.

4. The wireless communication device of claim 1, wherein the first communication device and the second communication device are the same device on the wireless communication device.

5. The wireless communication device of claim 1, wherein the predetermined delay is determined based upon the wireless communication device.

6. The wireless communication device of claim 1, wherein the predetermined delay is determined based upon a type of the second access probe.

7. The wireless communication device of claim 1, wherein the second communication device is further configured to add a randomization delay to the predetermined delay in the transmission of the second access probe in response to the determination indicating that the first access probe and the second access probe have the same priority level, and to send the second access probe to the base station after the predetermined delay and the randomization delay have elapsed.

8. The wireless communication device of claim 1, wherein the resources requested from the base station include a traffic channel.

9. The wireless communication device of claim 1, wherein the predetermined delay in the transmission of the second access probe is set to zero in response to the determination indicating that the second access probe does contain priority data.

10. The wireless communication device of claim 1, wherein the predetermined delay in the transmission of the second access probe is set to a value greater than zero in response to the determination indicating that the second access probe does not contain priority data, and wherein the second communication device is further configured to send the second access probe to the base station after the predetermined delay has elapsed.

11. A method for prioritizing access probes from a wireless communication device that selectively communicates with a base station having a slotted access protocol for incoming communications from wireless communication devices, the slotted access protocol including a plurality of discrete slots in which communication packets from wireless communication devices arrive and communication packets arriving earlier in a slot are handled first by the base station, the method comprising:
   synchronizing communications from the wireless communication device with the slotted access protocol of the base station;
   prioritizing when an access probe will arrive within the slots at the base station through determining whether the access probe contains priority data and setting a predetermined delay in a transmission of the access probe to the base station based on the determination, thereby causing higher priority access probes to arrive earlier in a slot at the base station; and
   sending the access probe to the base station to send data to or request resources from the base station.

12. The method of claim 11, wherein a computer platform of the wireless communication device includes a clock cycle wherein each cycle has a shorter duration than the slot at the base station, and wherein the predetermined delay in the transmission of the access probe to the base station is a predetermined integer number of clock cycles of the computer platform.

13. The method of claim 11, wherein the base station selectively ignores a priority in which the access probe arrives in the slot.

14. The method of claim 11, further comprising selectively changing the predetermined delay at the wireless communication device based upon predetermined criteria.

15. The method of claim 11, wherein setting the predetermined delay in the transmission of the access probe to the base station is determined based upon the wireless communication device.

16. The method of claim 11, wherein setting the predetermined delay in the transmission of the access probe to the base station is determined based upon a type of the access probe.

17. The method of claim 11, further comprising adding a randomization delay to the predetermined delay in the transmission of the access probe, wherein the access probe is sent to the base station after the predetermined delay and the randomization delay have elapsed.

18. The method of claim 17, wherein the randomization delay is added to the transmission of the access probe to randomize when the access probe will arrive within the slots at the base station relative to other access probes that have the same priority level.

19. The method of claim 11, wherein sending the access probe to the base station to request resources from the base station comprises requesting a traffic channel from the base station.

20. The method of claim 11, wherein the predetermined delay in the transmission of the access probe is set to zero in response to the determination indicating that the access probe does contain priority data.

21. The method of claim 11, wherein the predetermined delay in the transmission of the access probe is set to a value greater than zero in response to the determination indicating that the access probe does not contain priority data, and wherein the access probe is sent to the base station after the predetermined delay has elapsed.

22. A wireless communication device that selectively communicates with a base station wherein the base station includes a slotted access protocol for incoming communications from wireless communication devices, the slotted access protocol including a plurality of discrete slots in which communication packets from wireless communication devices arrive and communication packets arriving earlier in a slot are handled first by the base station, the wireless communication device comprising:
means for substantially synchronizing communications from the wireless communication device with the slotted access protocol of the base station;
means for establishing a traffic channel between the wireless communication device and the base station by requesting resources from the base station with a first access probe; and
means for sending a second access probe to the base station to send data to or request resources from the base station, the means further determining whether the second access probe contains priority data and prioritizing when the second access probe will arrive within the slots at the base station through setting a predetermined delay in a transmission of the second access probe from the wireless communication device to the base station based on the determination, thereby causing higher priority access probes to arrive earlier in a slot at the base station.

23. A computer-readable product, comprising:
a non-transitory computer-readable medium, comprising computer-executable instructions that, when executed on a wireless communication device, cause the wireless communication device to:
synchronize communications from the wireless communication device with a slotted access protocol of a base station, the slotted access protocol including a plurality of discrete slots in which communication packets from wireless communication devices arrive and communication packets arriving earlier in a slot are handled first by the base station;
prioritize when an access probe will arrive within the slots at the base station through determining whether the access probe contains priority data and setting a predetermined delay in a transmission of the access probe to the base station based on the determination, thereby causing higher priority access probes to arrive earlier in a slot at the base station; and
send the access probe to the base station to send data to or request resources from the base station.

24. The computer-readable product of claim 23, wherein the computer-executable instructions, when executed on the wireless communication device, further cause the wireless communication device to add a randomization delay to the predetermined delay in the transmission of the access probe, and to send the access probe to the base station after the predetermined delay and the randomization delay have elapsed.

25. The computer-readable product of claim 23, wherein the computer-executable instructions, when executed on the wireless communication device, further cause the wireless communication device to selectively change the predetermined delay based upon predetermined criteria.

26. The wireless communication device of claim 1, wherein the second communication device is further configured to add a randomization delay to the transmission of the first access probe and the second access probe in response to the determination indicating that the first access probe and the second access probe have the same priority level, thereby randomizing when the first access probe and the second access probe will arrive within one of the slots at the base station.

* * * * *